Patented Mar. 23, 1937

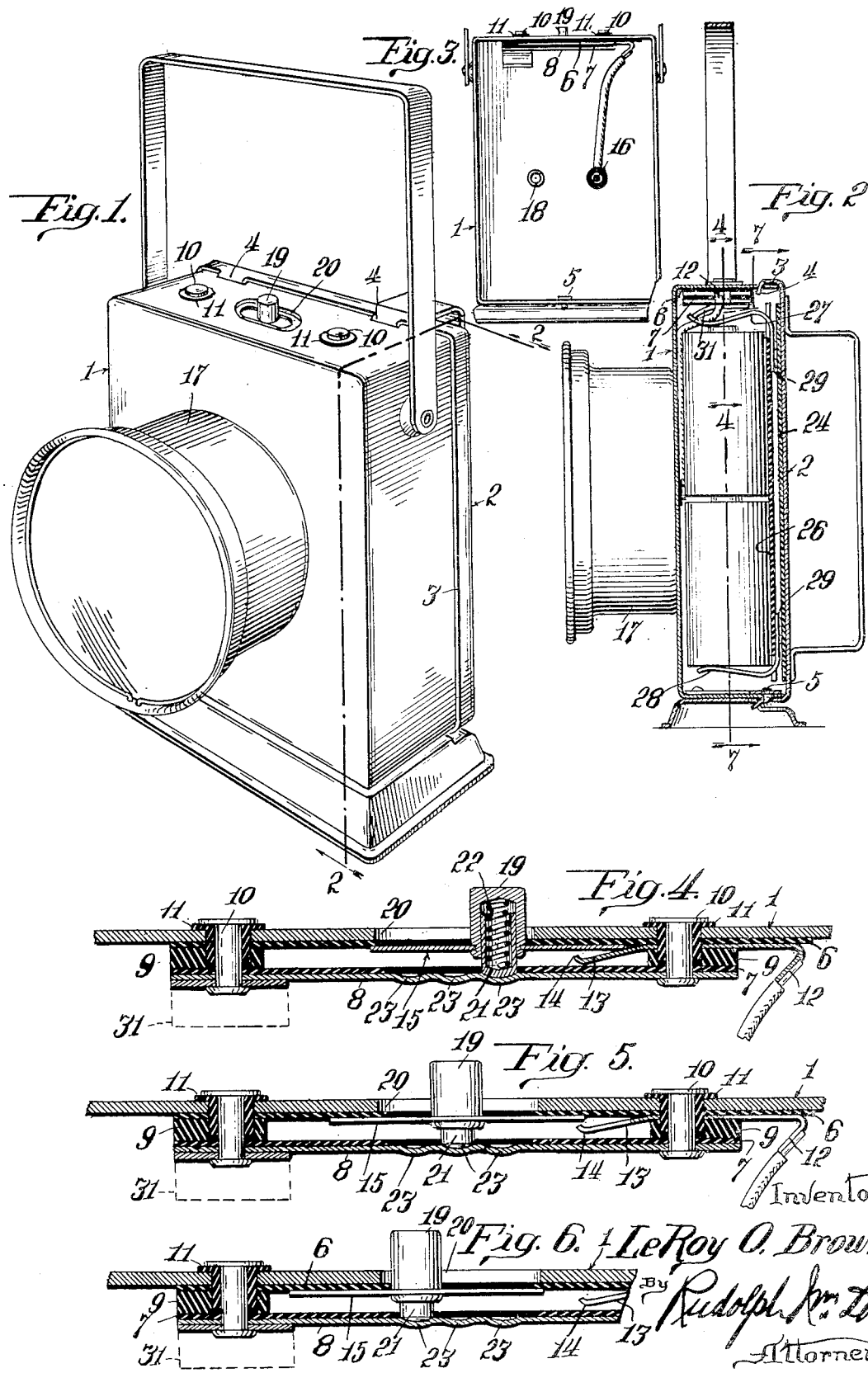

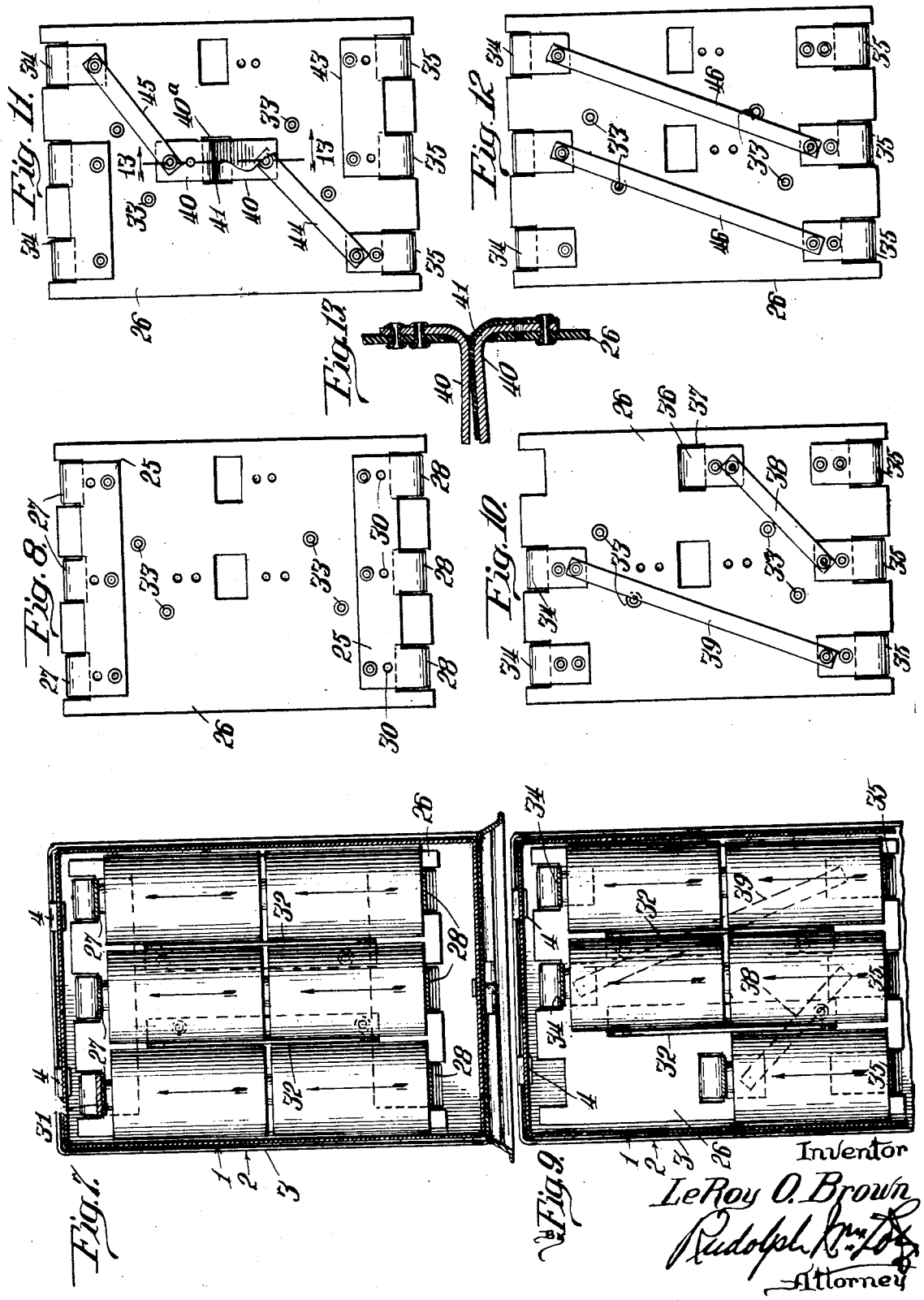

2,074,536

UNITED STATES PATENT OFFICE 2,074,536

PORTABLE ELECTRIC LAMP CASING

Le Roy O. Brown, Chicago, Ill., assignor to Justrite Manufacturing Company, Chicago, Ill., a corporation of Illinois Application August 2, 1935, Serial No. 34,422

2 Claims. (Cl. 240—10.6)

The main object of the present invention is to provide a battery casing for portable lamps such as electric lanterns and electric head lights of the type used by miners and hunters, wherein a plurality of battery cells is contained and which is equipped with interchangeable means whereby the batteries of the casing may be associated in various ways to produce current of different voltage to feed a selected type of electric lamp bulb.

More particularly, the object of the present invention is to provide a battery casing which is equipped with suitable contact members and a switch which are used without change in connection with any of the several relative arrangements of batteries disposed within said casing and wherein the cover member for the casing constitutes the battery carrier and is equipped with interchangeable means for disposing the batteries in various relative relations to each other to produce currents of different voltages as hereinafter more fully described.

Other objects of the invention will be pointed out in or readily understood from the following specification.

In the accompanying drawings illustrating a suitable embodiment of the invention, Fig. 1 is a perspective view of the battery casing embodying the form of a portable electric lantern constructed in accordance with the invention.

Fig. 2 is a vertical, longitudinal sectional view taken on the line 2—2 of Fig. 1.

Fig. 3 is a vertical, transverse, sectional view on a reduced scale, of the battery casing per se with cover and batteries removed, taken on the line 3—3 of Fig. 2.

Fig. 4, Fig. 5 and Fig. 6 are vertical, transverse, sectional views taken on the line 4—4 of Fig. 2 and on an enlarged scale, illustrating the switch controlling the battery circuits of the batteries disposed within the casing.

Fig. 7 is a sectional view on the line 3—3 of Fig. 2 but looking in the opposite direction from that of Fig. 3, illustrating the battery cells arranged in series of two each and three series in parallel with each other.

Fig. 8 is a rear elevation of the battery cell carrying plate constructed to receive the batteries in the relative arrangement shown in Fig. 7.

Fig. 9 is a view similar to Fig. 7 showing another relative arrangement of the battery cells wherein all of the latter are disposed in series.

Fig. 10 is a rear elevation of the battery cell carrier for the battery cell arrangement shown in Fig. 9.

Figs. 11 and 12 are views similar to Figs. 8 and 10, showing the rear views of battery carrying plates for relative arrangements of battery cells differing from those illustrated in Figs. 7 and 9.

Fig. 13 is a fragmentary detail sectional view taken on the line 13—13 of Fig. 11.

Referring first to Figs. 1 to 6, inclusive, it will be noted that the battery casing comprises the receptacle (1) of sheet metal which is equipped with a closure cover (2), the latter being equipped with a peripheral flange (3) in which the open rear portion of the receptacle (1) is received telescopically; the top wall of the receptacle (1) is equipped with slots in which the projections (4) of the upper edge flange (3) of the cover member are received to secure said cover substantially pivotally to the receptacle (1). The lower portion of the flange (3) of the cover (2) and the lower wall of the receptacle (1) are equipped with a suitable digitally releasable spring latch (5) for latching the cover firmly to the receptacle (1).

The battery casing is of rectangular form and in the instance illustrated is of a height sufficient to receive two super-imposed battery cells of the standard flash light size and its width is sufficient to receive three sets or pairs of said super-imposed battery cells.

Secured to the upper wall of the receptacle (1) is a plate (6) of suitable insulating material which extends over all of the inner face of said upper wall except the extreme end portions of the latter. Parallel with the plate (6) is a similar plate (7) and below the latter there is provided a sheet metal plate (8). The plates (6) and (7) are spaced from each other by means of insulating blocks (9) disposed between the plates (6) and (7). Rivets or grommets (10) equipped with the insulating sleeves (11) secure the plates (6), (7) and (8) and the spacing blocks (9) to the upper wall of the receptacle (1) as clearly shown in Fig. 4.

A sheet metal contact member (12) is interposed in part between the plate (6) and one of the spacing blocks (9), the same being provided with an opening through which the body of the insulating sleeve (11) passes. One end portion (13) of the contact member (12) is disposed in the free space between the insulating blocks (9) and the insulating plates (6) and (7), the terminal end portion (14) of said end portion (13) being disposed in contact substantially with the upper face of the plate (7) and being equipped with an upward bend which is opposed to a sliding plate (15) of sheet metal. The other end portion of the member (12) is connected with a grommet or rivet (16) shown in Fig. 3 which is insulated from the battery casing and constitutes a terminal of the electric lamp circuit.

In the instance illustrated, the lamp bulb is disposed within a housing (17) secured to the front wall of the receptacle (1) in a suitable manner. The other terminal (18) of the lamp circuit (also shown in Fig. 3) is grounded to the receptacle.

The plate (15) is secured to the digitally engageable switch member (19) movable transversely of the upper wall of the receptacle (1) in the longitudinal slot (20) therein, and the similar slot of the insulating plate (6) is flush with the slot (20). The member (19) constitutes an inverted cup in which there is received telescopically a second cup (21) which is movable reciprocally in said member (19) and which is held at the outer limit of its movement by means of the compression spring (22). The lower insulating plate (7) is provided with a slot which is aligned with the slot (20) and the portion of the sheet metal plate (8) disposed below said plate (7) is provided in the portion opposed to the slot in the plate (7) with three concave formations (23) opposed to the lower end of the cap (21), the latter being provided with a convex outer end to fit the said concave recesses.

The said plate (15) cooperates with the end portion (13) and terminal portion (14) of the member (12) to control the electric circuit through the lamp bulb.

In the position shown in Fig. 4, it will be noted that the plate (15) is in contact with and is wedged between the end portion (13) of the member (12) and the insulating plate (6) and is held in this position by engagement of the member (21) in the right hand recess (23). In this position the lamp circuit is closed. By moving the member (19) to the position shown in Fig. 5, it will be noted that the plate (15) is out of contact with the end portion (13) and one end of said plate is opposed to the terminal end portion (14) of the member (12) so that upon depressing the member (19) against the action of the spring (22), the said plate (15) will be thrown into contact with the said end portion (14) to close the circuit, said member (19) being reciprocated to close and open the lamp circuit for signaling purposes light.

By moving the member (19) to the position shown in Fig. 6, the lamp circuit is open. By reference to Fig. 1, it will be noted that the slot in the plate (6) through which the member (19) projects is of less length and width than the slot (20) in the top wall of the receptacle (1) and thus the member (19) is insulated from said receptacle (1) in all of its several positions shown in Figs. 4, 5 and 6.

By reference to Fig. 2, it will be seen that a plate (24) of insulating material is disposed to cover practically the entire flat wall of the cover (2) of the receptacle (1). Said plate (24) is secured to the said wall of said cover (2) by means of rivets or grommets shown in Figs. 8, 10, 11 and 12 which are so disposed as to have no influence on the electric battery circuit.

Disposed parallel with and in close proximity to the plate (24) is an insulating plate (26), shown in Fig. 2, which is equipped with battery carrying devices consisting in the main of flat springs (27) and (28) having slightly ogee curved end portions projecting from one face of said plate, the shank (29) of said springs being secured to the plate (26) in a suitable manner.

As shown in Fig. 8, the shanks of said springs are engaged with or form a part of the respective plates (25), the latter being secured to the sheet or plate (26) by means of rivets or grommets. It will be noted that in the lower plate (25) there are perforations (30) below the grommets or rivets which secure said plate (25) to the plate (26) and through which metallic fastening means such as grommets or rivets or detachable connecting means are passed, the latter extending also through the plate (24) and the cover plate (2) so that the several pairs of batteries which are disposed between the upper and lower connection plates 25, and which are held in place by said springs (27) and (28) are grounded to the casing at one end. The upper plate (25) is suitably connected with the plate (8) of the switch as by contact of one of the upper springs (27) with a downwardly extending tongue (31) of the said plate (8), said tongue being shown clearly in Figs. 4, 5 and 6.

The several grommets or rivets which secure the plate (24) to the cover (2) are arranged so that they come into contact only with the surface of the plate (26) and not with any of the rivets or grommets which secure battery cell engaging members to the latter.

It will be noted by reference to Fig. 7 that angle plates (32) are disposed so that one flange of each projects between two pairs of battery cells, the other flange of each of said plates being secured to the plate (26) by means of grommets or rivets (33) shown in Fig. 8 and indicated in dotted lines in Fig. 7.

In the structure illustrated in Figs. 7 and 8, each pair of battery cells is connected in series and the three sets of said battery cells are disposed in parallel, thus delivering, in the instance illustrated, a current of 2.5 volts to the lamp filament when the battery circuit is closed by the switch.

In the structure illustrated in Figs. 9 and 10, the several battery cell engaging springs (34) and (35) have their shanks secured individually to the insulating plate (26), the plate (25) being omitted. An additional spring (36) is employed in this structure, the shank of which is secured to the plate (26) and the battery cell engaging end portion of which projects through an opening (37) in said plate (26).

The angle plates (32) are employed for the same reasons as applied to the structure of Figs. 7 and 8, but in this structure only five battery cells are employed and are arranged relatively to each other so that one thereof is engaged between the spring (36) and the spring (35) opposed thereto, while the other two pairs of batteries are disposed between the opposed pairs of springs (34) and (35) in series as in the case of Figs. 6, 7 and 8. All of said five battery cells are connected in series by means of a flat strip (38) of metal which connects the spring (36) with the middle spring (35) and a similar strip (39) which connects the left-hand middle spring (35) with the right hand spring (34) in Fig. 10.

In the last-described structure, the current generated passes from the grounded left-hand spring (35) of Fig. 9 and is connected by means of the upper right hand spring (34) with the plate (8) of the switch by means of the said tongue (31) of the latter.

In the instance illustrated the voltage of the circuit generated by the series of five batteries, as shown, will be 6.3 and will permit use of a corresponding lamp in the lamp housing to be fed by the said current.

In the structure illustrated in Fig. 11, two sets of battery cells comprising three cells each, disposed in series, are employed, the two sets of said batteries being connected in parallel to generate a circuit of 3.8 volts. In this structure three of each of the springs (34) and (35) are employed. The lower left-hand and upper right-hand springs shown in Fig. 11 are secured individually to the plate (26). The middle and left-hand springs (34) are shown as integral with a plate (42) and the middle and right-hand springs (35) are shown to be integral with a plate (43), both of said plates being secured to the insulating plate (26).

Additionally, there is mounted upon the plate (26), a pair of L-shaped spring plates (40), one arm of each of which projects through a substantially central opening (40—a) of the plate (26). An insulating plate (41) is disposed between the projecting end portions of said plates (40). The said projecting end portions or arms of plates (40) cooperate with the respective opposed springs (34) and (35) to engage two superimposed battery cells which thus are insulated from each other. One of said plates (40) is connected by means of a metal strip (44) with the lower left-hand individual spring (35) of Fig. 11 and the other plate (40) is connected by means of the metal strip (45) with the upper left-hand individual spring of Fig. 11.

It will be obvious from this structure that a pair of battery cells disposed in series will be positioned and engaged between the left-hand springs (34) and (35) of Fig. 11 and another pair disposed in series will be interposed and engaged between the right-hand springs (34) and (35) of Fig. 11. Said last-mentioned pair of springs will be series connected with the lower middle battery cell by means of the plate (43) whereas the first-mentioned pair of battery cells will be connected in series with the upper middle battery cell by means of the plate (42).

The lower middle and left-hand springs (35) of Fig. 11 will be grounded to the casing in the same manner as is described in connection with Figs. 7 and 8 and the upper middle and left hand springs (34) of Fig. 11 will be connected with the tongue (31) of plate (8) of the switch.

The arrangement shown in Fig. 12 comprises a series of three individual upper springs (34) and a similar lower series of springs (35) secured individually to the plate (26).

In this structure six battery cells are disposed in the same relative positions as shown in Fig. 7 and all of said battery cells are joined in a single series to deliver a current of 7.5 volts. This is accomplished by connecting the upper right-hand spring (34) of Fig. 12 with the lower middle spring (35) of Fig. 12 and connecting the upper middle spring (34) with a lower left-hand spring (35), each of said connections being made by metal strips (46). The lower right-hand spring (35) of Fig. 12 is grounded to cover (2) and the upper left-hand springs (34) connected with the plate (8) of the switch by means of the tongue (31) of the latter.

It will be noted that all of the plates (26) of Figs. 8, 10, 11 and 12 are identical with each other and all thereof are provided with perforations disposed in exactly the same relative positions. The differences between the structures of Figs. 8, 10, 11 and 12 reside entirely in the metallic elements secured to the same and the main advantage of the invention lies in the fact that these several respective types of structures of said Figs. 8, 10, 11 and 12 may be produced in the factory and supplied to the dealers together with the battery casings (1) illustrated in Fig. 1, but in greater number and variety, so as to enable the dealer to meet all demands for portable illuminating equipment adapted to the particular demand of customers with respect to candle power of lamp bulb and corresponding voltage of current within the limits indicated hereinabove. The battery casing covers (2) will be equipped only with the insulating plate (24) and, as the customer states his need to the dealer for a certain illuminating equipment of any of the several illuminating equipment of any of the several the particular plate (26) equipped with battery cell engaging means adapted to the needs of the customer, which the dealer then easily and quickly secures in place within the cover (2) of the battery housing.

Another advantage of the invention lies in the fact that the manufacturer is not obliged to carry different sets of dies for the production of battery casings, but is required to be equipped only with very simple cutting and forming dies for the production of the several types of springs (34) and (35) and the plates with which they are integral or to which they may be permanently secured if desired, thus reducing the manufacturer's cost and also, of course, reducing the usual stock required to be carried by the dealer to meet all customers' requirements in the shape of fully assembled battery casings and battery carriers incorporated therein.

Thus, also the dealer's investment in the illuminating devices will be limited to a small number of battery casings and a larger stock of varieties of battery cell carriers as shown in the several Figs. 7 to 12, inclusive, shelf space being thus also economized by the dealer.

While the battery casing is illustrated as having the lamp casing secured thereto, the actual arrangement is such that said lamp casing may be detached and the terminal wires of a headlight, such as is worn by miners and sportsmen, secured detachably to the terminals (16) and (18) of the casing (1).

I claim as my invention:

1. In a portable illuminating set, a battery cell casing comprising two separable members, one thereof being equipped with a circuit controlling switch, an insulating plate mounted in the other of said members, a plurality of sets of battery engaging and supporting members secured to said plate, means on said plate for electrically connecting said cell supporting members for determining the voltage of the current generated by the battery cells, means for securing said plate to said last-mentioned member whereby one terminal of the battery cell circuit is grounded on the casing, a lamp circuit terminal grounded to the first-mentioned member, a lamp circuit terminal connected with the switch and insulated from the casing, one of the switch terminals being grounded to the casing, said battery cell carriers and switch being arranged relatively to each other to cause the battery cell circuit to be disposed for control by the switch as said members are inter-engaged with each other.

2. A battery cell casing comprising two separable members, a switch mounted in one of said members and having one of its terminals connected with said casing, a lamp circuit terminal grounded to said member, a lamp circuit terminal insulated from said member and connected with the other terminal of the switch, an insulating plate permanently secured to the other of said members, a second insulating plate mounted in said other member in opposed relation to said insulating plate, battery cell engaging and supporting means mounted upon the second insulating plate and arranged relatively to and connected with each other to determine the voltage of the current generated by said battery cells, means securing said last-named insulating plate to said first-named insulating plate and said casing, said means including means whereby one terminal of the battery circuit is grounded to said member, said members and switch and battery engaging members being relatively arranged so that upon inter-engagement of said first-named members with each other, the battery circuit will be disposed for control by said switch.

LE ROY O. BROWN.